March 14, 1933.  J. R. STERNAMAN  1,901,420
PIPE STRUCTURE
Filed Sept. 26, 1929
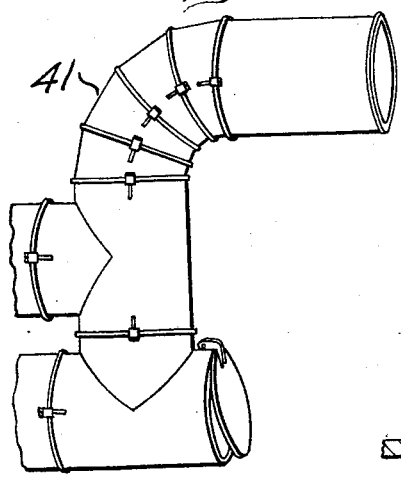
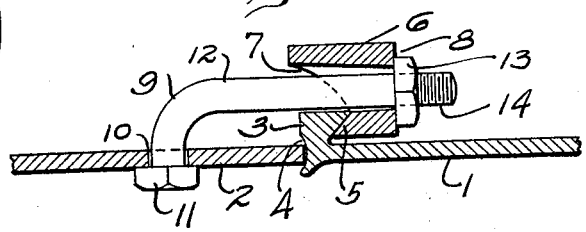
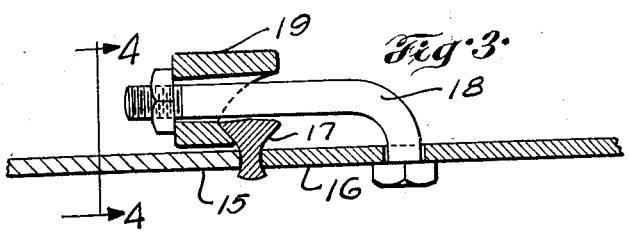
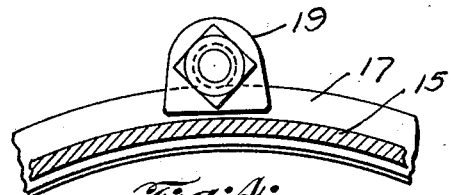
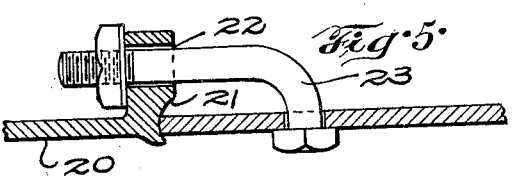
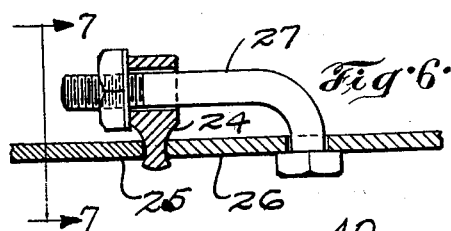
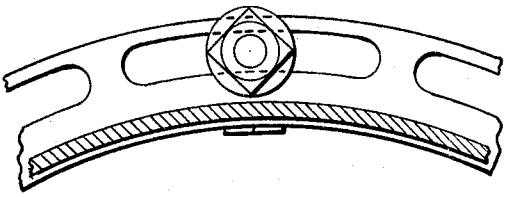
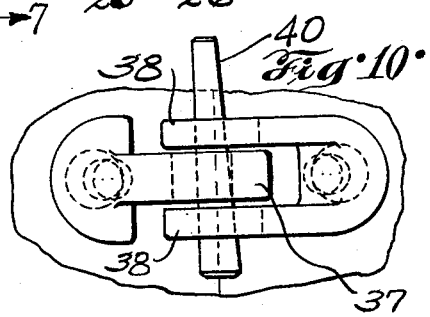
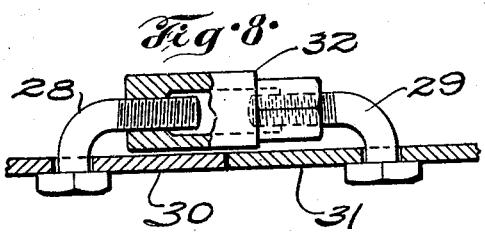
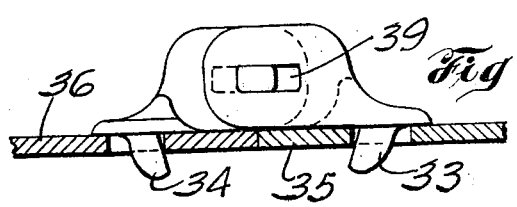
Inventor
John R. Sternaman
By Rodney Bedell
Attorney Patented Mar. 14, 1933

1,901,420

UNITED STATES PATENT OFFICE

JOHN R. STERNAMAN, OF SPRINGFIELD, ILLINOIS

PIPE STRUCTURE

Application filed September 26, 1929. Serial No. 395,437.

My invention relates to pipe structure and is particularly adapted for use in domestic heating furnace pipes and consists in a novel pipe and assembly structure.

The ordinary galvanized or black iron piping made of relatively thin gage material deteriorates rapidly and usually has to be replaced every two or three years unless the user takes it down every spring and stores it in a dry place. Most owners and practically all tenants do not take this precaution. The use of cast iron pipes has been suggested and adopted to a very slight degree, but the cost of such pipes, due to the lengths in which they have been made, and the fact that they are not adaptable for the many variations in installations which must be met, have handicapped the use of such cast iron pipe structures as have been proposed.

The main object of my present invention is to form cast iron pipes in such sections that they can be used in the ordinary domestic installations without special patterns or any different fitting on the part of the contractor doing the installing. In attaining this object, I have developed a novel pipe structure and assembling unit therefor illustrated in the accompanying drawing in which—

Figure 1 is a side elevation of an example of furnace pipe construction illustrating some of the connections which are required at different times although all of those illustrated may not be required in a single installation.

Figure 2 is a longitudinal section through two adjacent pipe sections illustrating the connecting unit.

Figure 3 is a similar section illustrating a modified connecting unit.

Figure 4 is a transverse section taken approximately on the line 4—4 of Figure 3.

Figure 5 is a vertical longitudinal section illustrating another modification.

Figure 6 is a similar section illustrating another modification.

Figure 7 is a transverse section taken approximately on the line 7—7 of Figure 6.

Figure 8 is a longitudinal section illustrating another modification.

Figure 9 is a longitudinal section illustrating another modification.

Figure 10 is a side elevation of the structure shown in Figure 9.

In each of the longitudinal sections I show the ends of two adjacent pipe sections which in Figure 2, may be designated as 1 and 2 respectively. Section 1 terminates in a flange 3 having a concaved surface 4 presented towards the abutting end of pipe section 2. The face 5 of flange 3 fronting away from pipe section 2 forms an acute angle with the side of the pipe. A washer 6 has one end notched as indicated at 7 to engage face 5 of flange 3 in such manner that the other end 8 of the washer will extend transversely of the pipe. A hook like bolt 9 may be inserted through a suitable opening 10 in the side of pipe 2 before the pipes are assembled and turned so that when the head 11 of the bolt is against the inner wall of the pipe, the shank 12 of the bolt will extend substantially parallel with the side of the pipe and may be inserted through washer 6 as shown and the nut 13 may be screwed on the threaded end 14 of the shank to clamp the pipe sections together.

In the construction shown in Figure 3, the pipe sections 15 and 16 have plain ends and a ring like member 17 is inserted between the ends, both faces of the ring being concaved to present a better seat for the end of the pipes. Bolt 18 and washer 19 correspond to the bolt and washer shown in Figure 2. It will be understood that there will be a plurality of bolts around the periphery of the pipes and alternate bolts will be hooked to the same pipe section, the intermediate bolts being hooked into the other pipe section.

In Figure 5, I illustrate a pipe section 20 having an integral flange 21 on one end. This flange is wider than that shown in Figure 2 and contains a series of holes or slots 22 for receiving the hook shaped bolts 23 thereby eliminating the special washer shown in Figures 2 and 3.

The construction shown in Figure 6 utilizes a separate ring member 24 arranged between the ends of pipe sections 25 and 26 similarly to the ring shown in Figure 3. Ring 24, however, is provided with openings for the bolts 27 thereby eliminating the special washers required in the structure shown in Figure 3.

The structure shown in Figure 8 utilizes a pair of hook bolts 28 and 29 inserted into the pipe sections 30 and 31 respectively and having their shanks threaded in opposite directions. A nut 23 is applied to the bolts as shown, the clamping structure comprising a turnbuckle for securing the two pipes together.

The structure shown in Figures 9 and 10 utilizes hook like elements 33 and 34 inserted through suitable openings in the pipe sections 35 and 36 from the outside of the latter. The members from which elements 33 and 34 project overlap each other as indicated at 37 and 38 and have openings 39 alined transversely of the members. A key or wedge 40 may be driven through members 37 and 38 engaging the outer ends of the slots or openings through these members and forcing the two members together thereby clamping the pipe sections to each other.

The structures illustrated afford a simple and easily manipulated joint which can be formed by any workman. By forming the pipe sections in lengths of twelve inches, for example, the same may be made of cast iron and approximately one eighth of an inch in thickness which will reduce the expense of the piping to a point where it may compete commercially with ordinary sheet metal piping when the durability of the cast pipe is taken into consideration.

By making elbow like sections having an angle of twenty two and one half degrees as indicated at 41 in Figure 1 it is possible to form any desired angle either between straight sections with their axes in the same plane or between sections having their axes inclined from each other and lying in different planes.

In each form of my invention, the use of a hook like bolt for engaging one pipe section and the use of a concave seat for the end of the pipe section avoids the necessity of accurate grinding of the ends of the pipes in order to provide a tight joint. It will be understood that suitable packing of asbestos cement or like material may be used between the joints and between the heads of the bolts and the side of the pipe etc., if desired.

Various other modifications may be made in the details of my invention without departing from the spirit thereof and I contemplate the exclusive use of such variations as come within the scope of my claims.

I claim:

1. Means for securing together the ends of adjacent pipe sections comprising an outward ridge on one of said ends, and a hook member having an end portion secured to the wall of the other section and a shank extending along said sections, a lug engaging the surface of said ridge facing away from said ends, said shank extending outside of said ridge and through said lug, and a nut threaded on said shank for drawing said sections together, said shank being spaced a substantial distance from the referred to end portion of said hook member and there being a curved portion of substantial radius between said shank and end portion, and the engaging surfaces of said ridge and said lug forming an acute angle with the wall of the adjacent section whereby expansion and contraction of said sections is facilitated without straining the sections or loosening the joint.

2. Means for securing together adjacent pipe sections comprising an annular projection rigid with one of the sections and having a shallow depression of curved cross section in its abutting surface, a bolt element having an end hooked into the wall of the other section and a shank extending along and spaced a substantial distance outwardly of said wall and passing over said projection, there being a curve of substantial radius between said end and said shank, and securing means on said bolt element adapted to engage said projection at substantially any part of the periphery thereof, the end of said second-mentioned section seating in said depression to properly aline said sections and resist play in the joint without affecting the adjustability thereof.

3. In combination, adjacent pipe sections and a pipe connection including an outward projection rigid with one of the sections, a bolt element having an end hooked into the wall of the other section and a shank spaced a substantial distance outwardly therefrom and passing over said projection, there being a curve of substantial radius between said end and said shank, securing means on said bolt element including a lug engaging said projection, and means preventing misadjustment and severance of said connection comprising a shallow depression of circular cross section in the abutting surface of said projection and receiving and centering the end of said second-mentioned section, and sloping engaging surfaces between said projection and said lug forming an acute angle with the wall of said first-mentioned section.

In testimony whereof I hereunto affix my signature this 23rd day of September, 1929.

JOHN R. STERNAMAN.